US012380209B2

(12) United States Patent
Kimura

(10) Patent No.: US 12,380,209 B2
(45) Date of Patent: Aug. 5, 2025

(54) IMAGE PROCESSING APPARATUS AND VIRUS CHECK METHOD FOR THE SAME

(71) Applicant: SHARP KABUSHIKI KAISHA, Sakai (JP)

(72) Inventor: Yohichi Kimura, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 267 days.

(21) Appl. No.: 18/223,523

(22) Filed: Jul. 18, 2023

(65) Prior Publication Data

US 2024/0028718 A1    Jan. 25, 2024

(30) Foreign Application Priority Data

Jul. 20, 2022   (JP) ................................ 2022-115736

(51) Int. Cl.
  *G06F 21/56*  (2013.01)
  *H04L 9/40*  (2022.01)

(52) U.S. Cl.
  CPC .......... *G06F 21/562* (2013.01); *H04L 63/145* (2013.01)

(58) Field of Classification Search
  CPC ......... G06F 21/56; G06F 21/562; H04L 9/40; H04L 63/145
  See application file for complete search history.

(56) References Cited

U.S. PATENT DOCUMENTS

| | | | | |
|---|---|---|---|---|
| 8,332,946 B1* | 12/2012 | Boisjolie | ............... | H04L 63/145 |
| | | | | 726/24 |
| 8,850,547 B1* | 9/2014 | Feeser | ................. | H04L 63/0272 |
| | | | | 709/225 |
| 2003/0074581 A1* | 4/2003 | Hursey | ................. | H04W 8/245 |
| | | | | 726/22 |
| 2007/0250627 A1* | 10/2007 | May | ..................... | H04L 41/0894 |
| | | | | 709/225 |
| 2017/0134398 A1* | 5/2017 | Wang | .................. | H04L 63/1416 |
| 2019/0394341 A1* | 12/2019 | Takahashi | ............ | H04N 1/0097 |

FOREIGN PATENT DOCUMENTS

| | | | |
|---|---|---|---|
| JP | 2005346183 A | * | 12/2005 |
| JP | 2010015513 A | * | 1/2010 |
| JP | 2020-119448 A | | 8/2020 |

\* cited by examiner

*Primary Examiner* — Jayesh M Jhaveri
(74) *Attorney, Agent, or Firm* — ScienBiziP, P.C.

(57) ABSTRACT

An image processing apparatus includes: a primary communication circuit for communication with an external device via a primary line; a secondary communication circuit for communication with a specific device via a secondary line; a transmission/reception processor communicating with the external device via the primary line or the specific device via the secondary line to acquire virus definition information from the external device or the specific device; a virus checker performing a virus check using the acquired virus definition information; and a line selector selecting communication using the primary communication circuit or communication using the secondary communication circuit. In a state where the communication via the primary line can no longer be established, the line selector selects the secondary line. In the case where the updated virus definition information is acquired via the secondary line, the virus checker performs the virus check by using such virus definition information.

7 Claims, 8 Drawing Sheets

IMAGE PROCESSING APPARATUS AND VIRUS CHECK METHOD FOR THE SAME

BACKGROUND OF THE INVENTION

Field of the Invention

The present disclosure relates to an image processing apparatus with a virus check function and a virus check method for the same.

Description of the Background Art

An image processing apparatus receives data on print processing, document reading processing, and the like (also referred to as job data) from an external device such as an information processing device, and executes the processing. The job data is treated as a file that is managed on an operating system (OS). As long as the job data is the file on the OS, a risk of a computer virus code being embedded in the file, which is stored in the external device, (a risk of infection) cannot be denied. For this reason, such an image processing apparatus has been known that performs a virus check on the data received from the external device, detects a file infected by a computer virus, and deals therewith.

The computer virus is a computer program that is designed to execute unauthorized processing. In a general method for detecting the computer virus by virus check software, a check target file is matched against a database in which a large number of program codes (also referred to as signature codes) related to peculiar processing contained in known viruses is registered. The database that is used for matching is referred to as virus definition information. A virus pattern file is a database file in which a part or whole of the signature code extracted from the known computer virus is registered to be storable, as the virus definition information, in the information processing device. In order to deal with a new computer virus, in reality, the virus pattern file is updated to the new virus definition information as needed on a weekly basis or on a daily basis. The risk of infection cannot be minimized unless the latest virus pattern file is acquired to perform the virus check.

As a general mode of acquiring the latest virus pattern file, the virus pattern file is downloaded from a server that provides the virus pattern file via the Internet. The image processing apparatus with a virus check function is used by being connected to a network not only for a purpose of receiving the job data but also for a purpose of acquiring the latest virus pattern file.

Meanwhile, in reality, many cases of the infection by the computer virus occur via the network. The computer virus replicates itself to other files and other devices through transmission of the file, which is embedded with the computer virus, to the other devices via the network. As a basic countermeasure against self-replication of the computer virus, the following countermeasure has been recommended. The device that is determined to be infected with the computer virus is disconnected from the network. Then, an antivirus software or a virus removal software is used to remove the computer virus. That is, the infected file is deleted.

There is a possibility that the image processing apparatus cannot communicate with the server, which provides the virus pattern file, over many days, for example, due to network communication failure, communication circuit failure, or the like. There is also a possibility that, when the computer virus is detected in the file, which is stored in the image processing apparatus, by the virus check, the image processing apparatus remains disconnected from the network over hours as the countermeasure. During such a period, the virus pattern file cannot be updated.

In the case where the image processing apparatus is activated after restoration from the communication failure, repair of the failure, or removal of the detected computer virus, the image processing apparatus should be connected after the virus check is performed by using the latest virus pattern file and it is confirmed that the computer virus is no longer detected. However, the virus pattern file is normally downloaded via the Internet from a server of a business that provides the virus check software. The latest virus pattern file cannot be acquired without the network connection. As a solution to resolve this contradiction, generally, the virus pattern file is transferred to the image processing apparatus through a storage medium, such as a USB flash drive, and the virus check is then performed. However, such a solution requires human intervention.

Meanwhile, such an image processing apparatus is available that includes a dedicated communication line to operate a charging service or a maintenance service, in addition to the communication line that is used for the communication with the external device transmitting the job data and the server providing the virus pattern file. In particular, many of the image processing apparatuses for business have such a function. Confidentiality of service data can be ensured by exchanging the service data with a specific server for management of the service via the service-dedicated communication line. In the case of communication via the network, as an aspect of the service-dedicated communication line, a virtual dedicated line by a virtual private network (VPN) connection is used. Usually, the service data that is exchanged between the image processing apparatus and the service management server has smaller communication data capacity than the job data, and is less frequently exchanged than the job data. For this reason, it is considered that, even when communication using a landline or a mobile-phone line is used, there is no significant impact on operational performance or economic performance. As a result, in addition to the communication by the network (a primary line), for which capacity to handle high-speed, high-capacity data communication is emphasized and through which the job data is transmitted/received, the communication by a dedicated line (a secondary line), for which the confidentiality is emphasized, is adopted.

The present disclosure has been made in view of circumstances as described so far and therefore provides a method for performing a virus check with latest virus definition information prior to a restart of communication via a primary line when a state where communication via the primary line is disallowed continues, for example.

SUMMARY OF THE INVENTION

The present disclosure provides an image processing apparatus that includes: a first communication circuit for communication with an external device via a first line; a second communication circuit for communication with a specific device via a second line; a transmission/reception processor that communicates with the external device via the first line or with the specific device via the second line to acquire virus definition information from the external device or the specific device; a virus checker that performs a virus check by using the acquired virus definition information; and a line selector that selects either one of the communication using the first communication circuit and the communication using the second communication circuit. In a state where the communication via the first line can no longer be established, the line selector selects the second line for acquisition of updated virus definition information from the specific device. In the case where the updated virus definition information is acquired via the second line, the virus checker performs the virus check by using the updated virus definition information.

From a different perspective, the present disclosure provides a virus check method that causes a controller of an image processing apparatus to: communicate with an external device via a first line; acquire virus definition information from the external device; perform a virus check by using the acquired virus definition information; communicate with a specific device via a second line in a state where communication via the first line can no longer be established; acquire updated virus definition information in the case where the specific device has the updated virus definition information; and perform the virus check by using the updated virus definition information. In the present disclosure, tentatively, the first line is set as the primary line, and the second line is set as the secondary line. However, the first line may be defined as the secondary line, and the second line may be defined as the primary line.

In the image processing apparatus according to the present disclosure, the line selector selects the second line in the state where the communication via the first line can no longer be established, and the virus checker performs the virus check by using the updated virus definition information in the case where the updated virus definition information is acquired via the second line. Thus, the virus check can be performed by using the latest virus definition information prior to a restart of the communication via the first line.

The same operational effect can be exerted by the virus check method according to the present disclosure.

DESCRIPTION OF THE PREFERRED EMBODIMENTS

A detailed description will hereinafter be made on the present disclosure with reference to the drawings. The following description is illustrative in all respects and should not be construed as limiting the present disclosure.

First Embodiment

Figure 1:
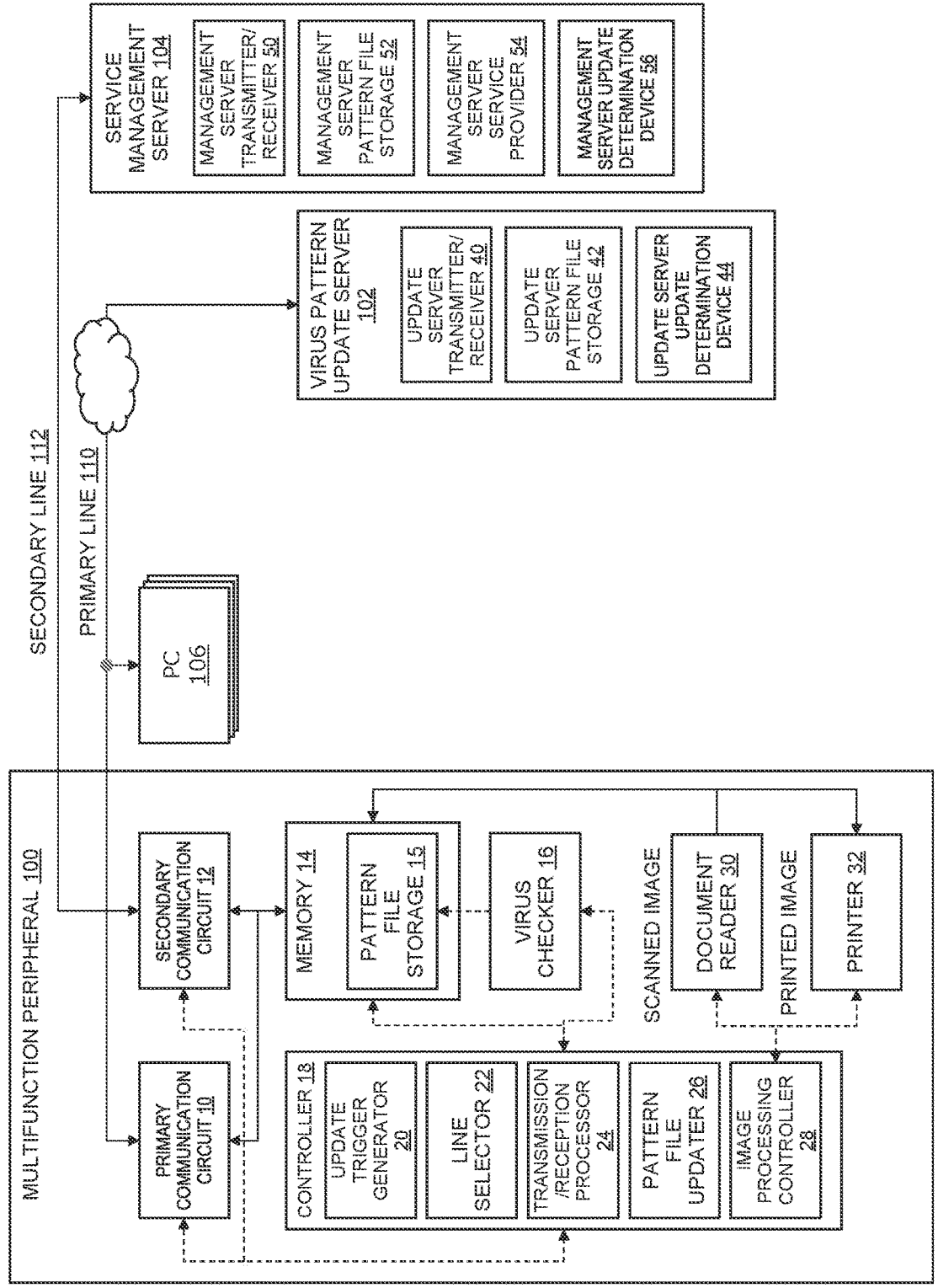
FIG. 1 is a block diagram illustrating a configuration in which a multifunction peripheral as an example of the image processing apparatus in an embodiment acquires a virus pattern file provided from an external device.

FIG. 1 is a block diagram illustrating a configuration in which a multifunction peripheral as an example of the image processing apparatus in this embodiment acquires a virus pattern file provided from an external device. As illustrated in FIG. 1, a multifunction peripheral 100 is communicably connected to a virus pattern update server 102 as the external device via a primary line 110 as a first line. In this embodiment, the multifunction peripheral 100 is connected to the external device as follows.

The multifunction peripheral 100 is installed in an office and is connected to an internal office network via a primary communication circuit 10. The primary line 110 illustrated in FIG. 1 corresponds to the office network. The primary line 110 is connected to the Internet via a gateway and can communicate with the device connected to the Internet. The virus pattern update server 102 is one of the communicable devices on the Internet. Furthermore, the multifunction peripheral 100 is connected to one or more personal computers used in the office via the primary line 110. APC 106 illustrated in FIG. 1 is such a personal computer. The multifunction peripheral 100 can perform printing according to job data received from the PC 106 (a print job). In addition, data on a document read by the multifunction peripheral 100 can be transferred to the PC 106 (a scanner job). Just as described, the multifunction peripheral 100 can transmit/receive the job data related to the print job and the scanner job to/from the PC 106, which is connected to the multifunction peripheral 100 via the primary line 110. Furthermore, the multifunction peripheral 100 communicates with the virus pattern update server 102 to acquire a virus pattern file.

The multifunction peripheral 100 is also connected to a secondary line 112 as a second line via a secondary communication circuit 12, and the secondary line 112 is a dedicated line with a service management server 104 as a specific device. In this embodiment, a VPN connection between the multifunction peripheral 100 and the service management server 104 is established by the secondary line 112. The office network is used for the communication via the secondary line 112. However, with the VPN connection, the secondary line 112 can be said as the substantially dedicated line. The service management server 104 is a server that is set up by a business providing a maintenance service for the multifunction peripheral 100, and transmits/receives data on charging and data on the maintenance service to/from the multifunction peripheral 100. The service management server 104 may be connected not only to the multifunction peripheral 100 but also to the other image processing apparatuses (not illustrated in FIG. 1), for each of which the above-described business provides the maintenance service, and may establish service-related communication with the plural image processing apparatuses. Here, the service management server 104 is connected to each of the target image processing apparatuses via the VPN connection or a dedicated line using a landline phone or a mobile phone, and establishes one-to-one communication therewith.

As illustrated in FIG. 1, the multifunction peripheral 100 includes the primary communication circuit 10, the secondary communication circuit 12, memory 14, a virus checker 16, a controller 18, a document reader 30, and a printer 32.

The primary communication circuit 10 is a communication circuit for the communication with the external devices (such as the PC 106 and the virus pattern update server 102 described above) via the primary line 110. The secondary communication circuit 12 is a communication circuit for the communication with the service management server 104 via the secondary line 112.

The memory 14 stores data and includes a pattern file storage 15. The pattern file storage 15 is a non-volatile, rewritable storage device (non-volatile memory) that stores virus definition information (a virus pattern) acquired from the external device and version information thereof. In this embodiment, a hard disk drive (HDD) is applied as the pattern file storage 15. However, the non-volatile storage device of another type, such as a solid-state drive (SSD), can also be applied.

While the pattern file storage 15 is formed from the non-volatile memory, the memory 14 in this embodiment is formed not only from the non-volatile memory but also by combining different types of the memory. The different types of the memory may include electrically erasable programmable read-only memory (EEPROM) as volatile memory, such as dynamic random access memory (DRAM) or static random access memory (SRAM), or the non-volatile memory such as read-only memory (ROM). The memory 14 stores not only the virus pattern file but also a processing program related to image processing, control data, and image data.

The virus checker 16 performs an inspection of the files stored in the memory 14 for infection with a computer virus, that is, a virus check. In addition, in the case where the infected file is detected, the virus checker 16 deletes the file to prevent a computer virus code embedded in the file from being executed. That is, the virus checker 16 takes a measure to prevent execution of unauthorized processing by the computer virus and self-replication of the computer virus. The measure for the file infected with the computer virus will also be referred to as virus removal.

The virus checker 16 is provided as a program module with which a processor provided in the multifunction peripheral 100 can execute virus check processing. A function of the virus checker 16 is implemented when the processor executes the program module. Specific processing of the virus checker 16 is processing to match plural pieces of the virus definition information, which are included in the virus pattern file stored in the pattern file storage 15, with the file stored in the memory 14 (pattern matching processing). In the case where a part that matches any of the virus definition information is detected from any of the files, the virus checker 16 determines that the file is infected with the computer virus.

The controller 18 is a control circuit including: the processor as a central component and a hardware resource; and circuits, such as a timer circuit, that are required to control the multifunction peripheral 100. The controller 18 includes, as a software resource, a control program executed by the processor. The control program is stored in the memory 14 in advance. A function as the controller 18 is implemented when the processor executes the control program.

The controller 18 includes an update trigger generator 20, a line selector 22, a transmission/reception processor 24, a pattern file updater 26, and an image processing controller 28. In this embodiment, each of these elements is executed as a task under environment of an OS capable of performing multitasking. That is, each of the update trigger generator 20, the line selector 22, the transmission/reception processor 24, the pattern file updater 26, and the image processing controller 28 is provided as a program module that causes the processor to execute processing thereof. A function of each of these elements is implemented when the processor executes the respective program module. As a result, the controller 18 acquires the virus pattern file from the external device and updates the virus pattern file. In addition, the controller 18 controls the document reader 30 and the printer 32 to execute the image processing.

The processor as the hardware resource of the controller 18 may be a different processor from the processor that executes the program module of the virus checker 16, or may be common therewith. In this embodiment, the processors are common.

A description will hereinafter be made on each block provided in the controller 18. The update trigger generator 20 provides a trigger of processing to access the virus pattern update server 102 and check for the updated virus pattern file.

The line selector 22 selects whether to transmit/receive a virus pattern update check to/from the virus pattern update server 102 via the primary line 110 or to transmit/receive the virus pattern update check to/from the service management server 104 via the secondary line 112 when transmitting/receiving the virus pattern update check.

The transmission/reception processor 24 processes transmission/reception with the external device via the selected line. The transmission/reception processor 24 controls the transmission/reception of the virus pattern update check with the virus pattern update server 102 and the service management server 104. Furthermore, the transmission/reception processor 24 controls the transmission/reception of the job data and the transmission/reception related to the image processing with the PC 106. Moreover, the transmission/reception processor 24 processes the transmission/reception by the multifunction peripheral 100 with the external device via the primary line 110.

When being provided with the updated virus pattern file from the virus pattern update server 102 or the service management server 104, the pattern file updater 26 stores the virus pattern file in the pattern file storage 15.

The image processing controller 28 controls execution of a job related to the image processing by controlling the document reader 30 and the printer 32.

The document reader 30 is a part of the apparatus related to reading of an image of a document. The document reader 30 includes a document feeder, a document table, and an image sensor, and the image sensor reads the image of the document that is fed by the document feeder. The document reader 30 also scans the document placed on the document table and reads the document by the image sensor. Then, image data of the read document is stored in the memory 14. In the case of the scanner job, the document reader 30 transmits the image data of the document the external device selected by the user, such as the PC 106. In the case of a copy job, the image data of the document is printed by the printer 32.

The printer 32 forms and outputs the image on a print sheet on the basis of the image data stored in the memory 14. In the case of the print job, the image data is received from the external device such as the PC 106. In the case of the copy job, the image data is read by the document reader 30. Although means for forming the image is not limited, for example, a toner image may be formed by using an electrophotographic technique. Alternatively, an inkjet technology may be used to form the image with ink. Further alternatively, the image may be formed by using a sublimation dye.

In FIG. 1, a solid arrow connecting each of the blocks of the multifunction peripheral 100 indicates the transmission/reception of the data. A chained arrow indicates control or data reference.

The PC 106 is one or more PCs that are used in the same office as the multifunction peripheral 100 and can communicate with the multifunction peripheral 100 via the primary line 110. Although not illustrated in FIG. 1, the multifunction peripheral 100 may transmit/receive the job data via the primary line 110 to/from with a different type of the information processing device from the PC 106, such as a smartphone or a file server.

The virus pattern update server 102 is a server that is set up by the business providing the virus check software to allow a user to download a virus definition information file used for the virus check.

The virus pattern update server 102 includes an update server transmitter/receiver 40, an update server pattern file storage 42, and an update server update determination device 44.

The update server transmitter/receiver 40 is a software module related to a communication circuit and communication control for processing communication between the virus pattern update server 102 and the external device for transmission/reception via the Internet. A function of the update server transmitter/receiver 40 is implemented when a processor of the virus pattern update server 102 executes the software module.

The update server pattern file storage 42 is memory that stores the latest virus pattern file.

The update server update determination device 44 executes processing to respond to the virus pattern update check that is transmitted from the multifunction peripheral 100 or the other image processing apparatus. The multifunction peripheral 100 adds the version information of the virus pattern file stored in the pattern file storage 15 to the virus pattern update check and transmits those to the virus pattern update server 102. The update server update determination device 44 matches the version information, which is added to the virus pattern update check received from the multifunction peripheral 100, against the version information of the latest virus pattern file stored in the update server pattern file storage 42. In the case where the version information received from the multifunction peripheral 100 is older than the version information of the latest virus pattern file, as a response, the latest virus pattern file is returned with the version information to the multifunction peripheral 100. On the other hand, in the case where the version information received from the multifunction peripheral 100 is the same as the version information of the latest virus pattern file, such a response that there is no update is returned to the multifunction peripheral 100. The update server update determination device 44 is a software module, and a function of the update server update determination device 44 is implemented when the processor of the virus pattern update server 102 executes the software module.

The service management server 104 is a server that is set up by the business operating a charging service or the maintenance service to exchange service-related information with the image processing apparatus (including the multifunction peripheral 100) as a service target. The service management server 104 includes a management server transmitter/receiver 50, a management server pattern file storage 52, a management server service provider 54, and a management server update determination device 56.

The management server transmitter/receiver 50 is a software module related to a communication circuit and communication control for processing the communication between the service management server 104 and the multifunction peripheral 100 for transmission/reception via the secondary line 112. The management server transmitter/receiver 50 processes communication related to a management service and the virus pattern file update provided by the service management server 104. A function of the management server transmitter/receiver 50 is implemented when a processor of the service management server 104 executes the software module.

The management server pattern file storage 52 is memory that stores the latest virus pattern file. In this embodiment, the service management server 104 first stores the latest virus pattern file in the management server pattern file storage 52 in order to perform the virus check on the file stored therein. In addition thereto, the service management server 104 can provide the virus pattern file to the image processing apparatus (including the multifunction peripheral 100) as the service target. However, while the primary line 110 is a communication line that emphasizes high-speed, high-capacity data communication capacity, the secondary line 112 is a dedicated line that emphasizes confidentiality and establishes one-to-one communication between the multifunction peripheral 100 and the service management server 104. The service data that is transmitted/received via the secondary line 112 is smaller in volume than the job data that is transmitted/received via the primary line 110. Accordingly, the virus pattern update check is usually transmitted/received to/from the virus pattern update server 102 via the primary line 110.

The management server service provider 54 is a software module related to processing of the charging service and the maintenance service provided via the service management server 104 to the image processing apparatus as the service target, including the multifunction peripheral 100. A function of the management server service provider 54 is implemented when the processor of the service management server 104 executes the software module.

The management server update determination device 56 corresponds to the update server update determination device 44 that is provided in the virus pattern update server 102. When the multifunction peripheral 100 performs the virus pattern update check via the secondary line 112, the management server update determination device 56 executes processing that corresponds to the virus pattern update check on the service management server 104 side. The description has been made so far on the overview of the configuration related to the acquisition of the virus pattern file illustrated in FIG. 1.

Virus Pattern Update Check Using Primary Line and Secondary Line

Next, a description will be made on an example of a case where the controller 18 of the multifunction peripheral 100 performs the virus pattern update check via the primary line and performs the virus check by using the updated virus pattern file. A description will further be made on an example of a case where, in a state where the communication via the primary line can no longer be established, the updated virus definition information is acquired from the service management server 104 via the secondary line to perform the virus check.

Figure 2:
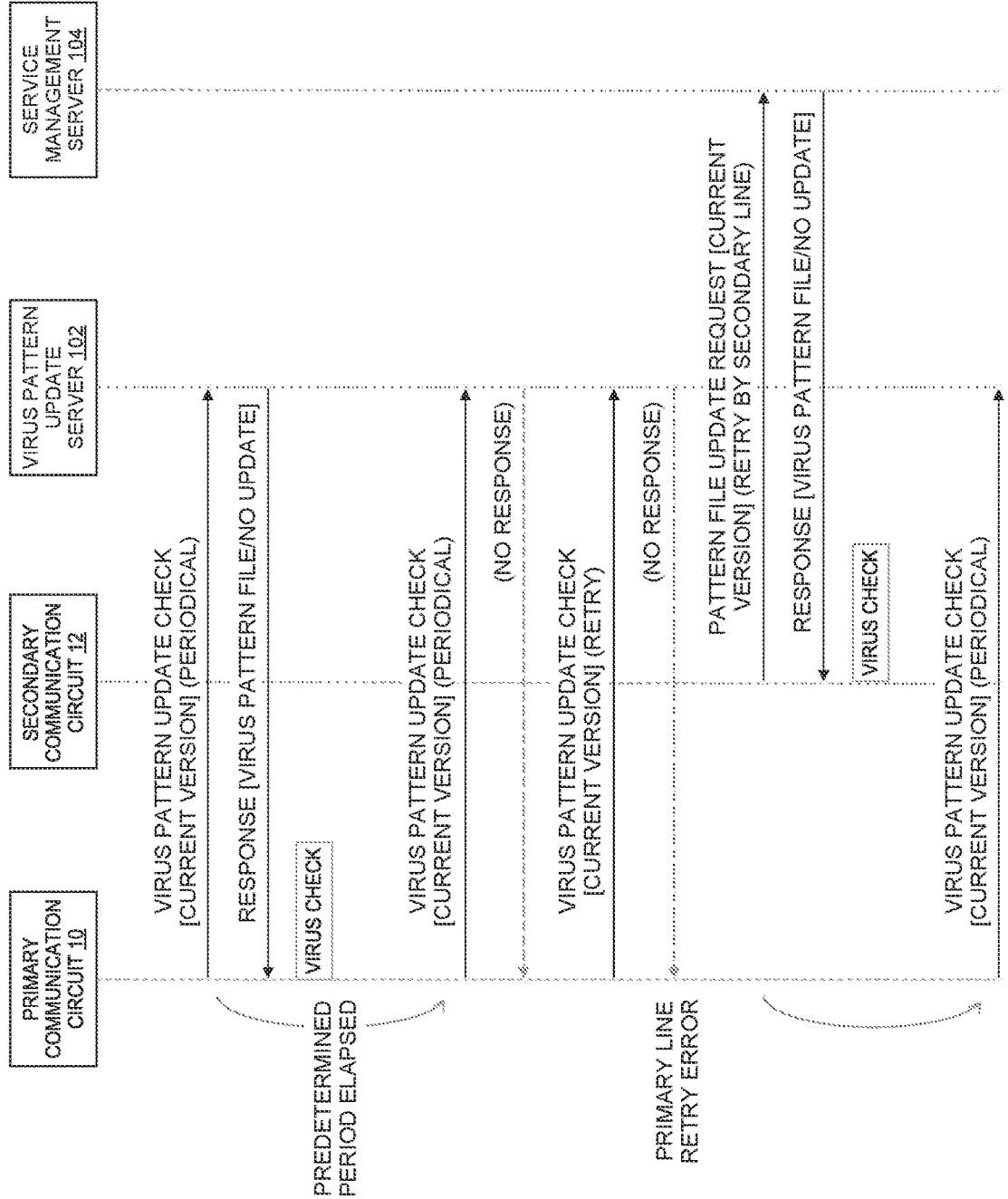
FIG. 2 is an explanatory chart illustrating a processing example in the case where a response to a virus pattern update check via a primary line is not returned in the embodiment.

FIG. 2 is an explanatory chart illustrating an example in which the virus pattern update check is performed via the primary line 110 in this embodiment. FIG. 2 is further an explanatory chart illustrating a processing example in the case where a response to the virus pattern update check is not returned.

Figure 3:
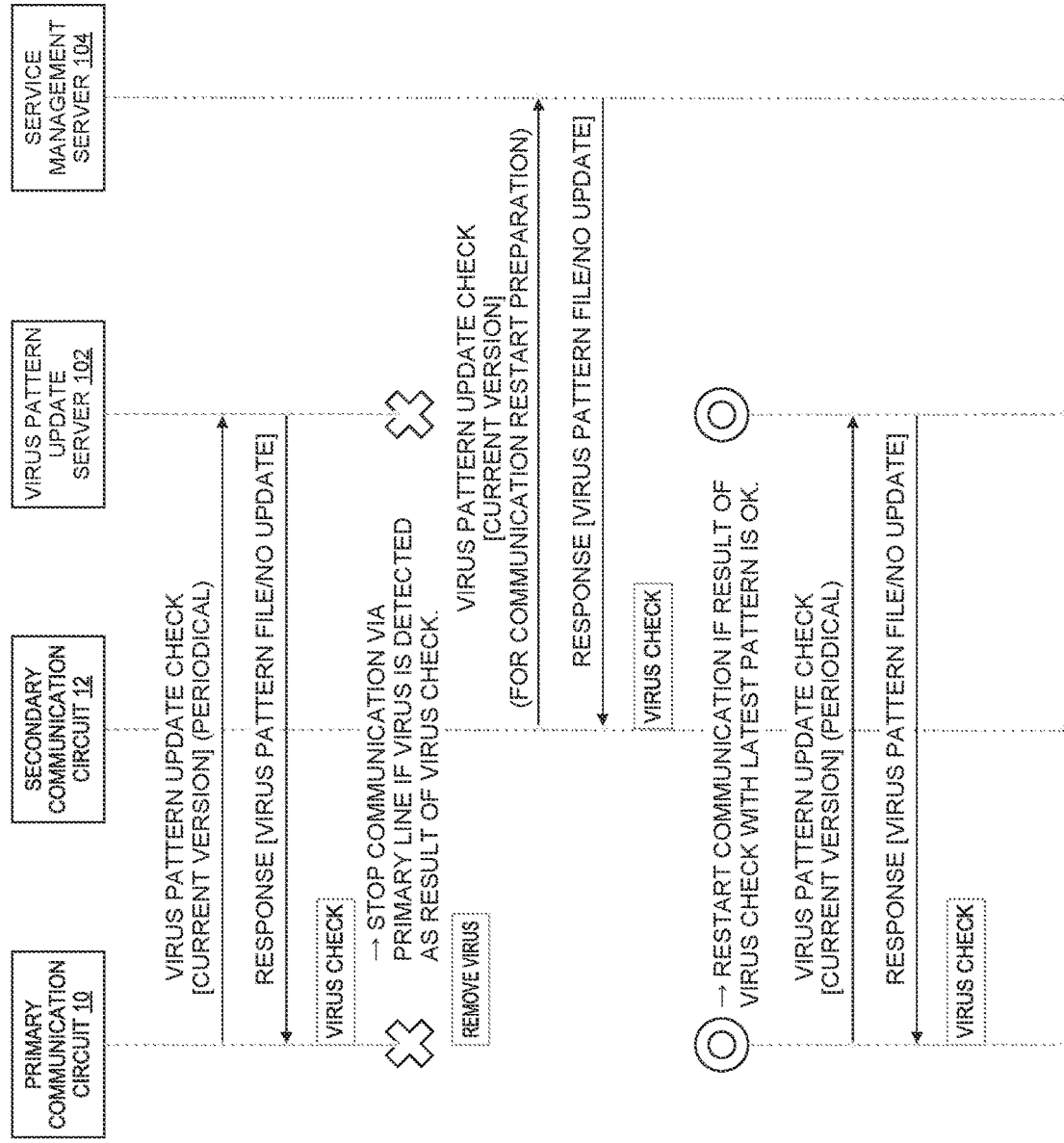
FIG. 3 is an explanatory chart illustrating an example of a procedure for detecting and removing a computer virus, thereafter acquiring a latest pattern file, performing a virus check, and restarting communication in the embodiment.

FIG. 3 is an explanatory chart illustrating an example in which, when the infected file is detected as a result of the virus check, the virus pattern update check is performed via the secondary line 112, the virus check is then performed, and the communication via the primary line 110 is thereafter restarted.

In the example illustrated in FIG. 2, in the multifunction peripheral 100, the update trigger generator 20 generates the trigger to perform the virus pattern update check every predetermined first period (one day as an example). The line selector 22 selects the primary line 110 in a normal case of performing the virus pattern update check. Also, in the example illustrated in FIG. 2, the first virus pattern update check is performed via the primary line 110. The transmission/reception processor 24 transmits the virus pattern update check to the virus pattern update server 102 via the selected primary line 110. The version information of the virus pattern file, which is stored in the pattern file storage 15, is added to the virus pattern update check to be transmitted.

The virus pattern update server 102 that has received the virus pattern update check responds as follows.

The update server update determination device 44 in the virus pattern update server 102 matches the version information, which is added to the received virus pattern update check, against the version information of the latest virus pattern file, which is stored in the update server pattern file storage 42.

In the case where the received version information is the same as the version information of the virus pattern file, which is stored in the update server pattern file storage 42, the update server update determination device 44 returns a response indicating that there is no update. On the other hand, in the case where the received version information is older than the version information of the virus pattern file, which is stored in the update server pattern file storage 42, the update server update determination device 44 determines that the update is necessary. In such a case, the update server update determination device 44 returns, as the response, the latest virus pattern file, which is stored in the update server pattern file storage 42, along with the version information thereof.

In the multifunction peripheral 100 that has received the response, the following processing is executed.

When receiving the updated virus pattern file, the transmission/reception processor 24 passes the updated virus pattern file to the pattern file updater 26. The pattern file updater 26 replaces the virus pattern file, which is stored in the pattern file storage 15, with the updated virus pattern file. In addition, the pattern file updater 26 updates the version information, which is stored in the pattern file storage 15, to the version information of the updated virus definition information. The virus checker 16 then performs the virus check by using the updated virus pattern file. Even in the case where the received response indicates that there is no update, the virus checker 16 may perform the virus check to ensure the periodical virus check.

As it has been described so far, the multifunction peripheral 100 periodically performs the virus pattern update check and performs the virus check.

FIG. 2 illustrates processing in the case where, in addition to the response to the normal periodical virus pattern update check, the response to the virus pattern update check is not returned from the virus pattern update server 102 within a predetermined second period. As a cause of no response, for example, communication failure of the primary line 110, malfunction of the primary communication circuit 10, or the like is considered. In the case where the response to the virus pattern update check is not returned within the predetermined second period, the transmission/reception processor 24 retransmits the virus pattern update check to the virus pattern update server 102 via the primary line 110. This is a retry that is made by the transmission/reception processor 24 when no response is returned, not limited to the virus pattern update check. In the case where the response is returned within the predetermined second period after the retry is made (when the retry is successful), previous failure of the response is considered as temporary communication failure, and the normal processing is continued.

On the other hand, in the case where no response is still received within the predetermined second period after the retries are made, the transmission/reception processor 24 determines that a retry error has occurred in the communication via the primary line 110.

In the case where the retry error occurs in the communication via the primary line 110, the line selector 22 selects the secondary line 112. The transmission/reception processor 24 transmits the virus pattern update check to the service management server 104 via the secondary line 112. The above can be said as the retry of the virus pattern update check using the secondary line 112.

The service management server 104 that has received the virus pattern update check executes the same processing as that by the virus pattern update server 102, and returns the response to the multifunction peripheral 100. That is, in the case where the received version information is the same as the version information of the virus pattern file stored in the management server pattern file storage 52, the management server update determination device 56 returns a response indicating that there is no update. On the other hand, in the case where the received version information is older than the version information of the virus pattern file stored in the management server pattern file storage 52, the management server update determination device 56 returns, as the response, the latest virus pattern file along with the version information thereof.

The management server pattern file storage 52 in the service management server 104 stores the latest virus pattern file, which is acquired from the virus pattern update server 102 via the Internet, for own virus check.

In the multifunction peripheral 100 that has received the response through the retry via the secondary line 112, the same processing as that in the normal periodical virus pattern update check is executed. That is, when receiving the updated virus pattern file, the pattern file updater 26 replaces the virus pattern file, which is stored in the pattern file storage 15, with the updated virus pattern file. The virus checker 16 then performs the virus check by using the updated virus pattern file. Even in the case where the received response indicates that there is no update, the virus checker 16 may perform the virus check.

In the case where no virus-infected file is detected as a result of the virus check, next, the update trigger generator 20 generates a next trigger, and the normal virus pattern update check is performed via the primary line 110.

The description has been made so far on the example of the virus pattern update check illustrated in FIG. 2.

Next, a description will be made on an example of the virus pattern update check illustrated in FIG. 3. FIG. 3 illustrates an example of a case where the file infected with the computer virus is detected as a result of the virus check by the virus checker 16.

In the case where the virus-infected file is detected, the transmission/reception processor 24 stops the communication via the primary line 110, thereby brings the multifunction peripheral 100 into a state of being disconnected from the network, and then the virus is removed. In regard to the secondary line 112, the service management server 104 is notified that the virus-infected file has been detected, and thereafter the communication via the secondary line 112 is stopped. The virus checker 16 executes processing for the virus removal by deleting the file infected with the computer virus, or the like.

In the case where the autonomous virus removal by the virus checker 16 is difficult, a maintenance service operator who has received the notification, via the service management server 104, that the multifunction peripheral 100 has been infected with the virus takes a countermeasure. For example, the service operator acquires necessary virus removal software from the virus pattern update server 102 and saves the virus removal software in a medium such as a USB flash drive. Then, the service operator brings the medium to the location where the multifunction peripheral 100 is installed, and executes removal processing.

Even after the virus is removed, the transmission/reception processor 24 does not restart the communication via the primary line 110 immediately.

Once the virus checker 16 completes the virus removal, the virus pattern update check is transmitted to the service management server 104 via the secondary line 112 prior to a restart of the communication via the primary line 110. The line selector 22 selects the secondary line 112, and the transmission/reception processor 24 transmits the virus pattern update check to the service management server 104 via the secondary line 112. Just as described, in the case where the virus pattern file is updated, the latest virus pattern file is acquired. The virus checker 16 performs the virus check by using the latest virus pattern file. Due to this procedure, even in the state where the multifunction peripheral 100 is disconnected from the primary line 110, the virus check is performed by using the latest virus pattern file.

This is a countermeasure that takes into account a possibility that the virus pattern file is updated in a period from the detection of the file infected with the computer virus to the completion of the virus removal. In order to prevent the computer virus from spreading to other devices that are connected via the primary line 110, the communication via the primary line 110 is restarted after safety is confirmed. For the above reason, the one-to-one communication with the service management server 104 is established via the secondary line 112 as the dedicated line to perform the virus pattern update check. As a result, in the case where the updated virus pattern file is available, the updated virus pattern file is acquired.

Once the virus checker 16 performs the virus check and confirms that there is no problem, the transmission/reception processor 24 restarts the communication via the primary line 110.

Thereafter, the periodical virus pattern update check is performed via the primary line 110 as usual.

The description has been made so far on the example illustrated in FIG. 3.

Flowchart

Figure 4:
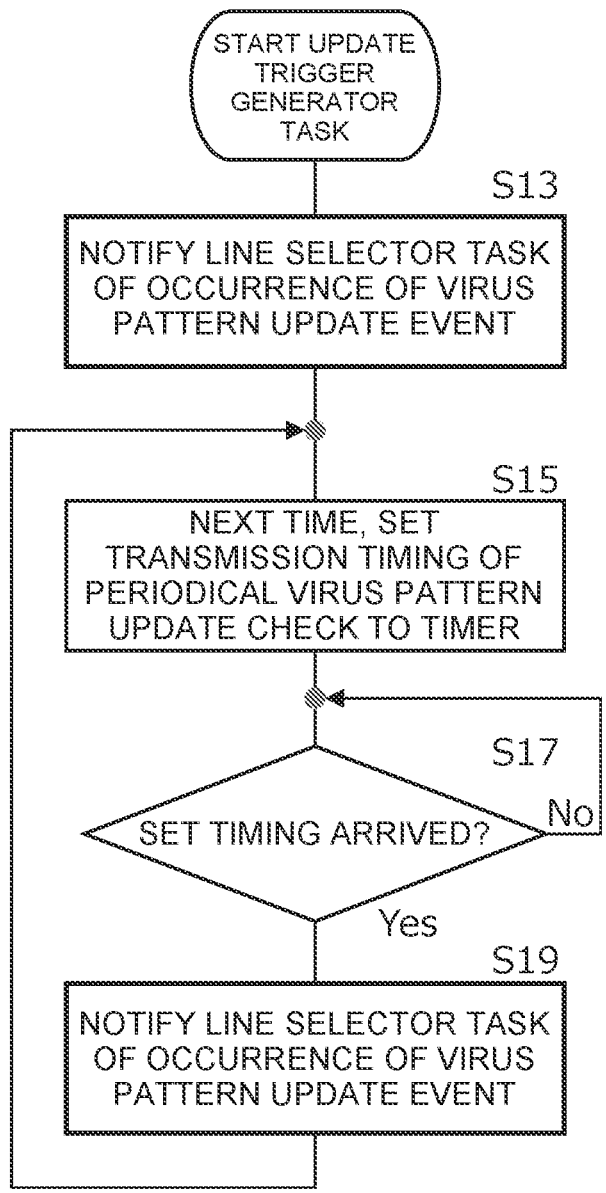
FIG. 4 is a flowchart illustrating a processing example to check whether the virus pattern file provided from the external device has been updated in the embodiment.
Figure 5:
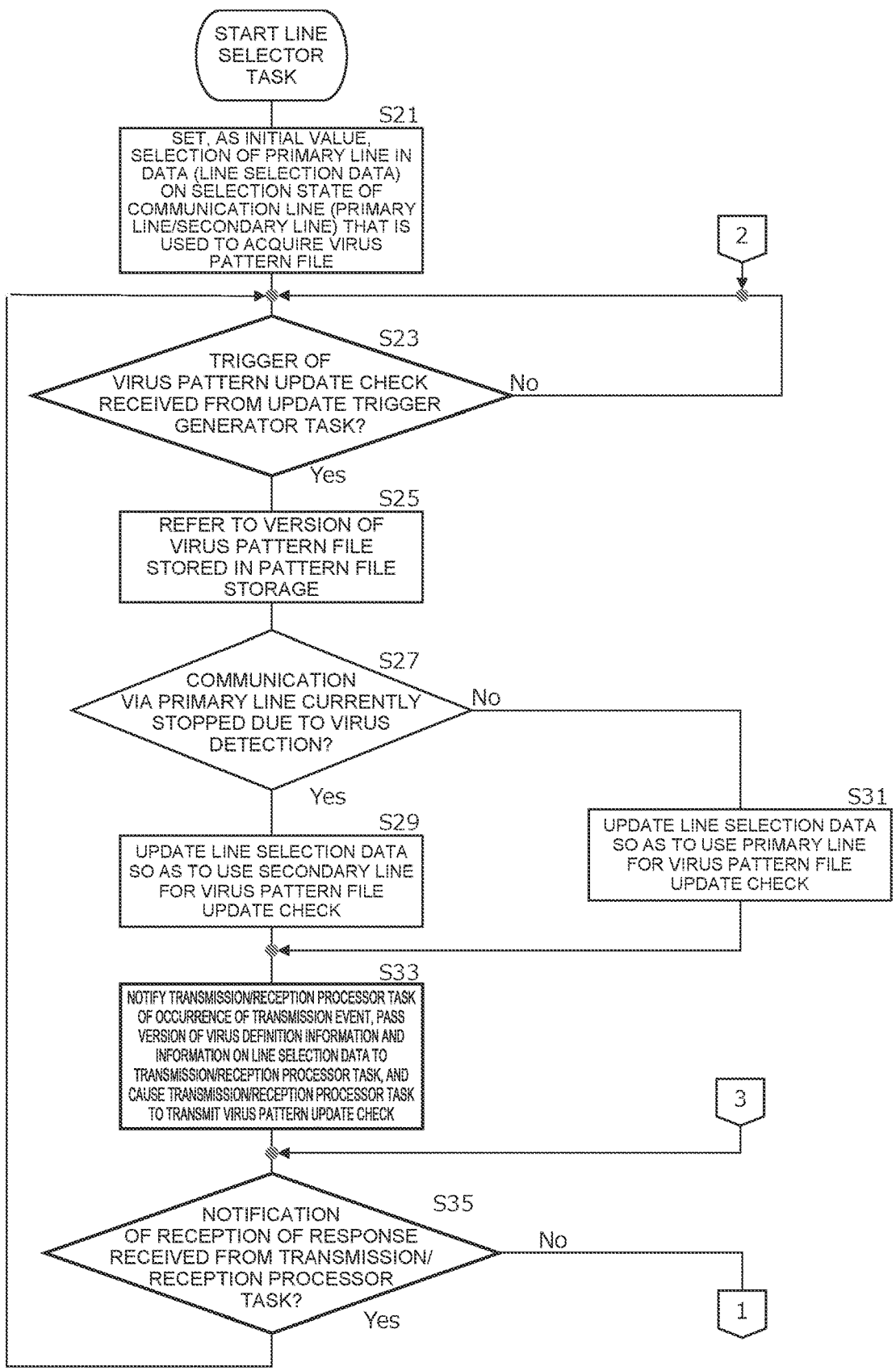
FIG. 5 is a first flowchart illustrating a processing example that is executed as a task by a line selector in the embodiment.
Figure 6:
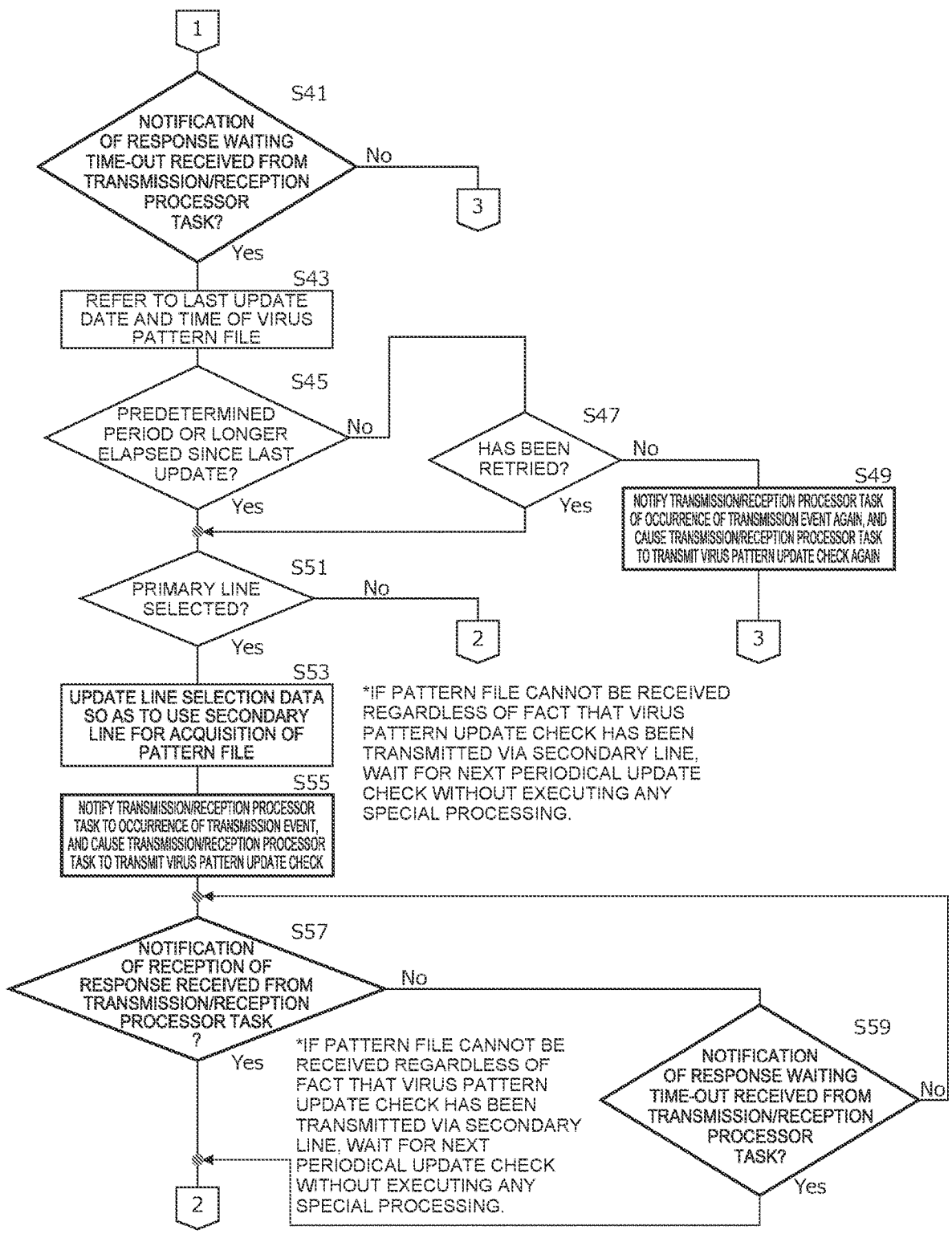
FIG. 6 is a second flowchart illustrating the processing example that is executed as the task by the line selector in the embodiment.
Figure 7:
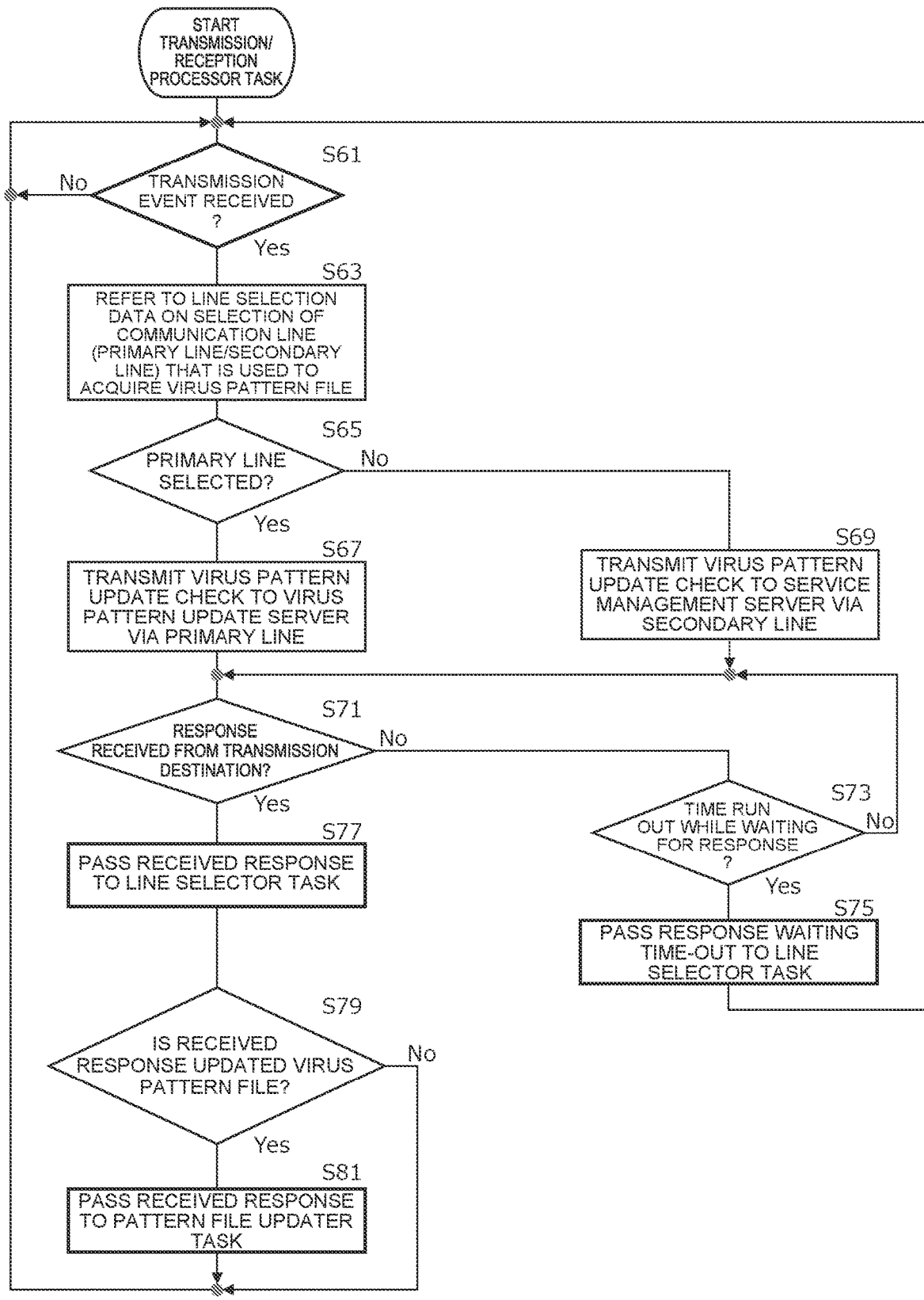
FIG. 7 is a flowchart illustrating a processing example that is executed as a task by a transmission/reception processor in the embodiment.
Figure 8:
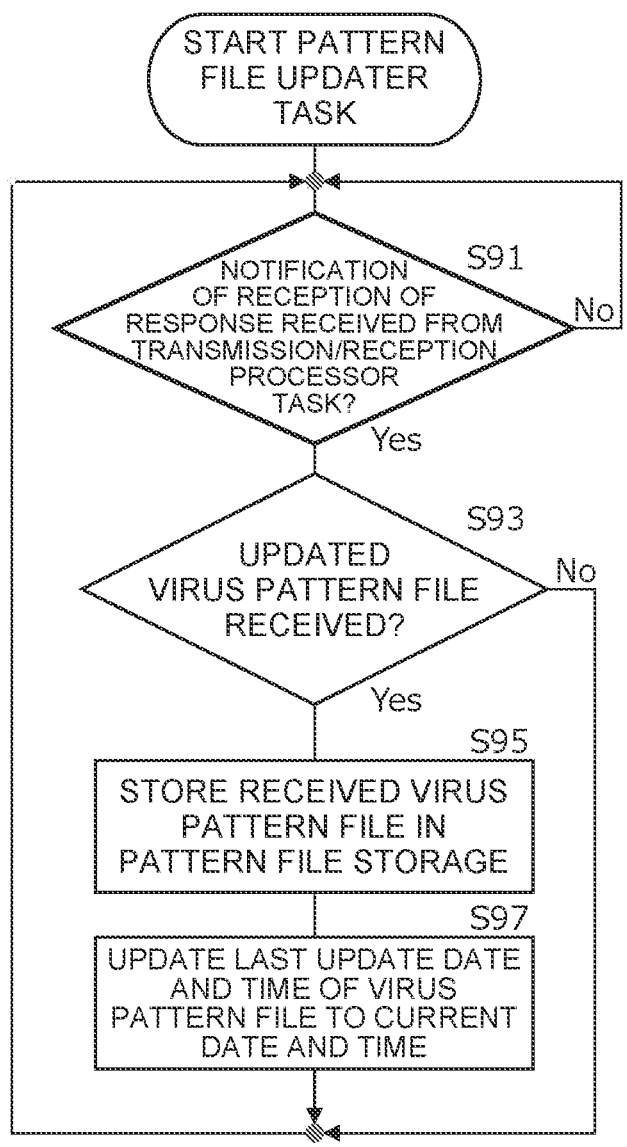
FIG. 8 is a flowchart illustrating a processing example that is executed as a task by a pattern file updater in the embodiment.

Hereinafter, a description will be made on a processing procedure related to the virus pattern update check that is performed by the controller 18 with reference to flowcharts. FIG. 4 to FIG. 8 are flowcharts each illustrating a processing procedure that is executed by respective one of the devices in the controller 18 in this embodiment. FIG. 4 illustrates processing related to the update trigger generator 20. FIG. 5 and FIG. 6 each illustrate processing related to the line selector 22. FIG. 7 illustrates processing related to the transmission/reception processor 24. FIG. 8 illustrates processing related to the pattern file updater 26.

In this embodiment, each block is executed as a task under a multitasking environment. The flowcharts illustrated in FIG. 4 to FIG. 8 each conform to a task configuration thereof. In the flowcharts illustrated in FIG. 4 to FIG. 8, processing to wait for a notification provided to another task and a notification from the other task is indicated by a bold frame line.

As illustrated in FIG. 4, in regard to a task as the update trigger generator 20, in the case where the multifunction peripheral 100 is powered on or returns from a shutdown state for power saving, execution of each of the tasks related to the controller 18 is eventually initiated after the processor of the multifunction peripheral 100 initiates the processing. When the execution of the task is initiated, the task as the update trigger generator 20 notifies a task of the line selector 22 of occurrence of an event related to the trigger of the virus pattern update check. That is, the task as the update trigger generator 20 generates the trigger of the virus pattern update check (step S13).

Next, the task as the update trigger generator 20 sets timing of transmitting the virus pattern update check to a timer (step S15). Then, the task as the update trigger generator 20 waits for arrival of the timing that is set to the timer (a loop of No in step S17). When the set timing arrives, the task as the update trigger generator 20 notifies the task of the line selector 22 of occurrence of an event to perform the virus pattern update check (step S19). Then, the processing returns to step S15 described above, and the task as the update trigger generator 20 sets next timing of transmitting the virus pattern update check to the timer. In this way, the task as the update trigger generator 20 generates the trigger of the virus pattern update check every time the predetermined first period elapses. In one example, the timer is set for one day later.

Next, a description will be made on the task as the line selector 22 with reference to FIG. 5 and FIG. 6.

In this embodiment, the task as the line selector 22 stores a selection state of the primary line 110 or the secondary line 112 in line selection data as a static variable in the memory 14, and updates a value of the line selection data.

When the processor of the multifunction peripheral 100 initiates the processing, and the execution of each of the tasks related to the controller 18 is eventually initiated, the task as the line selector 22 sets a value indicating selection of the primary line 110 as an initial value of the line selection data (step S21 in FIG. 5). Then, the task as the line selector 22 waits to receive the trigger of the virus pattern update check from the task as the update trigger generator 20 (a loop of No in step S23).

When receiving the trigger of the virus pattern update check, the task as the line selector 22 refers to the version information of the virus pattern file that is stored in the pattern file storage 15 (step S25). This is to add the version information to the virus pattern update confirmation to be transmitted later.

Next, the task as the line selector 22 determines whether a current state is a state where the virus-infected file has been detected and the communication via the primary line 110 has been stopped (step S27). If the communication via the primary line 110 has been stopped (Yes in step S27), the task as the line selector 22 sets the line selection data to the selection state of the secondary line 112 (step S29). On the other hand, if the communication via the primary line 110 has not been stopped (No in step S27), the task as the line selector 22 sets the line selection data to the selection state of the primary line 110 (step S31).

Then, the task as the line selector 22 notifies a task as the transmission/reception processor 24 of occurrence of a transmission event. The transmission event is an event related to the transmission of the virus pattern update check (step S33). At this time, the task as the line selector 22 passes the version information, which is referred in step S25 described above, and information on the line selection data, which is set in steps S29 or S31 described above, to the task as the transmission/reception processor 24.

Then, the task as the line selector 22 determines whether the task as the transmission/reception processor 24 has transmitted the virus pattern update check and a notification of reception of the response has been received from the task as the transmission/reception processor 24 (step S35).

If the response has been received (Yes in step S35), the processing returns to step S23, and the task as the line selector 22 waits to receive the next trigger of the virus pattern update check.

On the other hand, if the response has not been received (No in step S35), the task as the line selector 22 determines whether a response waiting time-out notification has been received from the task as the transmission/reception processor 24 (step S41 shown in FIG. 6).

If the response waiting time-out notification has not been received (No in step S41), the processing returns to step S35 illustrated in FIG. 5, and the task as the line selector 22 waits to receive the notification of the reception of the response or the response waiting time-out notification (a loop of No in step S35, No in step S41, and returning to step S35).

If the response waiting time-out notification is received in step S41 described above (Yes in step S41), the task as the line selector 22 refers to last date and time when the virus pattern file is updated (step S43). This information on the date and time is updated by a task as the pattern file updater 26, which will be described below.

Then, the task as the line selector 22 determines whether a predetermined third period has elapsed since the last date and time when the virus pattern file is updated (step S45).

If the predetermined third period has elapsed (Yes in step S45), the processing proceeds to step S51, which will be described below.

On the other hand, if the predetermined third period has not been reached (No in step S45), the task as the line selector 22 determines whether a communication retry has been made (step S47). If the communication retry has been made (Yes in step S47), the processing proceeds to step S51, which will be described below. If the response waiting time-out does not occur after the communication retry but the response waiting time-out occurs at a stage where the communication retry is not made (No in step S47), the task as the line selector 22 notifies the task as the transmission/reception processor 24 of the occurrence of the transmission event and causes the task as the transmission/reception processor 24 to retransmit the virus pattern update check. That is, the communication retry is made for the response waiting time-out.

Then, the processing returns to step S35 illustrated in FIG. 5, and the task as the line selector 22 waits to receive the notification of the reception of the response or the response waiting time-out notification for the virus pattern update check that has been transmitted in the reply (the loop of No in step S35, No in step S41, and returning to step S35).

If it is determined Yes in step S45 described above, or if it is determined Yes in step S47, the task as the line selector 22 refers to the line selection data. Then, the task as the line selector 22 determines whether it is currently in the selection state of the primary line 110 or the selection state of the secondary line 112 (step S51).

If it is currently in the selection state of the secondary line 112 (No in step S51), the processing returns to step S23 in FIG. 5, and the task as the line selector 22 waits to receive the next trigger of the virus pattern update check from the task as the update trigger generator 20. In the case where the response waiting time-out occurs despite the transmission of the virus pattern update check via the secondary line 112, no special processing is executed therefor, and the task as the line selector 22 waits to receive the next trigger of the virus pattern update check.

If it is currently in the selection state of the primary line 110 (Yes in step S51), the task as the line selector 22 sets the line selection data to the selection state of the secondary line 112 (step S53). Then, the task as the line selector 22 notifies the task as the transmission/reception processor 24 of the occurrence of the transmission event, and causes the task as the transmission/reception processor 24 to transmit the virus pattern update check to the service management server 104 via the secondary line 112 (step S55). That is, in response to the response waiting time-out that has occurred after the communication retry is made for the primary line 110, the communication line is switched to the secondary line 112, and the communication retry is made.

Then, the task as the transmission/reception processor 24 transmits the virus pattern update check to the service management server 104, and the task as the line selector 22 determines whether the notification of the reception of the response has been received from the task as the transmission/reception processor 24 (step S57).

If the response has been received (Yes in step S57), the processing returns to step S23 described above, and the task as the line selector 22 waits to receive the next trigger of the virus pattern update check.

On the other hand, if the response has not been received (No in step S57), the task as the line selector 22 determines whether the response waiting time-out notification has been received from the task as the transmission/reception processor 24 (step S59).

If the response waiting time-out notification has not been received (No in step S59), the processing returns to step S57, and the task as the line selector 22 waits to receive the notification of the reception of the response or the response waiting time-out notification (a loop of No in step S57, No in step S59, and returning to step S57).

If the response waiting time-out notification has been received (Yes in step S59), the processing returns to step S23 without executing no special processing, and the task as the line selector 22 waits to receive the next trigger of the virus pattern update check. In the case where the response waiting time-out occurs despite the transmission of the virus pattern update check via the secondary line 112, no special processing is executed therefor, and the task as the line selector 22 waits to receive the next trigger of the virus pattern update check.

The description has been made so far on the task as the line selector 22.

Next, a description will be made on the task as the transmission/reception processor 24 with reference to FIG. 7. It has been described that the transmission/reception processor 24 processes the transmission/reception between the multifunction peripheral 100 and the external device via the selected line. Of those types of the processing, FIG. 7 only illustrates the processing related to the transmission/reception of the virus pattern update check, which is characteristic in this embodiment, and the rest of the processing related to the other types of the transmission/reception is not illustrated.

When the processor of the multifunction peripheral 100 initiates the processing, and the execution of each of the tasks related to the controller 18 is eventually initiated, the task as the transmission/reception processor 24 waits to receive the transmission event from the task as the line selector 22 (a loop of No in step S61). When receiving the transmission event (Yes in step S61), the task as the transmission/reception processor 24 refers to the line selection data (step S63) and determines whether the line used for the transmission/reception is the primary line 110 or the secondary line 112 (step S65).

If it is currently in the selection state of the primary line 110 (Yes in step S65), the task as the transmission/reception processor 24 transmits the virus pattern update check to the virus pattern update server 102 via the primary line 110 (step S67). The task as the transmission/reception processor 24 adds the version information, which is stored in the pattern file storage 15, to the virus pattern update check to be transmitted.

On the other hand, if it is currently in the selection state of the secondary line 112 (No in step S65), the task as the transmission/reception processor 24 transmits the virus pattern update check to the service management server 104 via the secondary line 112 (step S69). The task as the transmission/reception processor 24 adds the version information, which is stored in the pattern file storage 15, to the virus pattern update check to be transmitted.

Then, the task as the transmission/reception processor 24 determines whether the response to the virus pattern update check, which has been transmitted in step S67 or S69 described above, has been received (step S71). If the response has not been received (No in step S71), the task as the transmission/reception processor 24 determines whether the second period, which has been set in advance to wait for the response, has elapsed and thus the response waiting time-out has occurred (step S73). As it has been described so far, the task as the transmission/reception processor 24 waits until the response is received or the response waiting time-out occurs (a loop of No in step S71, No in step S73, and returning to step S71).

If the response waiting time-out has occurred (No in step S73), the task as the transmission/reception processor 24 notifies the task as the line selector 22 of the occurrence of the response waiting time-out (step S75), the processing returns to step S61 described above, and the task as the transmission/reception processor 24 waits to receive the next transmission event.

If the response to the transmitted virus pattern update check has been received (Yes in step S71), the task as the transmission/reception processor 24 passes the received response to the task as the line selector 22 (step S77). If the response is the updated virus pattern file (step S79), the task as the transmission/reception processor 24 passes the updated virus pattern file to the task as the pattern file updater 26 (step S81), the processing returns to step S61 described above, and the task as the transmission/reception processor 24 waits to receive the next transmission event.

On the other hand, if the received response indicates that there is no update (No in step S79), the processing returns to step S61 without providing the trigger to the pattern file updater 26, and the task as the transmission/reception processor 24 waits to receive the next transmission event. The description has been made so far on the processing by the task as the transmission/reception processor 24 illustrated in FIG. 7.

Next, a description will be made on the task as the pattern file updater 26 illustrated in FIG. 8.

When the processor of the multifunction peripheral 100 initiates the processing, and the execution of each of the tasks related to the controller 18 is eventually initiated, the task as the pattern file updater 26 waits to receive such a notification, from the task as the transmission/reception processor 24, that the response to the virus pattern update check has been received (a loop of No in step S91). When receiving the notification that the response has been received (Yes in step S91), the task as the pattern file updater 26 determines whether the received response is the updated virus pattern file (step S93).

If the updated virus pattern file has been received (Yes in step S93), the task as the pattern file updater 26 replaces the virus pattern file, which is stored in the pattern file storage 15, with the received virus pattern file. That is, the virus pattern file is updated to the received virus pattern file (step S95). In addition, the task as the pattern file updater 26 updates the version information, which is stored in the pattern file storage 15, to the version information of the updated virus pattern file. Furthermore, the task as the pattern file updater 26 updates the date and time of the last update of the virus pattern file, which is stored as the static variable in the memory 14, to the date and time when the virus pattern file is updated in step S95. Then, the processing returns to step S91 described above, and the task as the pattern file updater 26 waits to receive a next notification, from the task as the transmission/reception processor 24, that the response to the virus pattern update check has been received.

On the other hand, if it is determined in step S93 that the received response is not the updated virus pattern file, the processing returns to step S91 described above. The virus pattern file that is stored in the pattern file storage 15 is kept as is, and the date and time of the last update of the virus pattern file is not updated.

The description has been made so far on the task as the pattern file updater 26 illustrated in FIG. 8.

Second Embodiment

In the first embodiment, the description has been made that the secondary line 112 is the substantially dedicated line used to establish the VPN connection between the multifunction peripheral 100 and the service management server 104. However, the aspect of the secondary line 112 is not limited thereto. For example, such an aspect can be adopted that a public line for the landline phone or a 4G or 5G communication line for the mobile phone is used as the secondary line 112. It can be said that the date communication using the communication line for the landline phone or the mobile phone is not suited for the high-speed, high-capacity data communication but is sufficient for the service data exchange. Since confidentiality of a call is ensured, the above date communication is suited for the service data exchange with the service management server 104.

Third Embodiment

In the first embodiment, the description has been made that the management server pattern file storage 52 of the service management server 104 stores the latest virus pattern file, which is acquired from the virus pattern update server 102 via the Internet, for the own virus check. However, even in such a case, when the virus pattern update check is received from the image processing apparatus as the service target such as the multifunction peripheral 100, with the reception of the virus pattern update check being a trigger, the virus pattern update server 102 may be accessed, and the latest virus pattern file may be acquired. In this way, prior to the restart of the communication via the primary line 110, the virus check can reliably be performed by using the latest virus pattern file.

As it has been described so far, (i) the image processing apparatus according to the present disclosure includes: the first communication circuit for the communication with the external device via the first line; the second communication circuit for the communication with the specific device via the second line; the transmission/reception processor that communicates with the external device via the first line or with the specific device via the second line to acquire the virus definition information from the external device or the specific device; the virus checker that performs the virus check by using the acquired virus definition information; and the line selector that selects either one of the communication using the first communication circuit and the communication using the second communication circuit. In the state where the communication via the first line can no longer be established, the line selector selects the second line for the acquisition of the updated virus definition information from the specific device. In the case where the updated virus definition information is acquired via the second line, the virus checker performs the virus check by using the updated virus definition information.

In the present disclosure, the image processing apparatus has the two systems of the communication circuits that are the first communication circuit and the second communication circuit. An example of a specific aspect of the first communication circuit is a communication circuit for connection to an intranet. The intranet is further connected to a server on the Internet via an Internet gateway. An example of a specific aspect of the second communication circuit is a circuit for communication with the service-dedicated management server via the dedicated line by using the landline or the mobile phone line or by using the VPN.

Each of the transmission/reception processor, the virus checker, and the line selector may include a circuit that has, as central components, a processor and memory as hardware resources, for example. The function of each of those is implemented when the processor executes a processing program that is stored in the memory.

Furthermore, a state where the communication cannot be established means a state where the communication with the external device cannot be established regardless of a cause. An example of a specific aspect thereof is a state where the communication via the line cannot be established due to disconnection of the line or failure of the device in a communication path. A different example thereof is a state where the communication cannot be established due to failure of the communication circuit in the image processing apparatus. Furthermore, the state where the communication cannot be established includes a state where, as a result of the virus check by the virus checker, the computer virus is detected in any of the files stored in the image processing apparatus, and the image processing apparatus is disconnected from the line.

A description will further be made on preferred aspects of the present disclosure.

(ii) In the case where the state where the communication via the first line cannot be established continues over a predetermined period or more, the transmission/reception processor in the controller may acquire the updated virus definition information via the second line. According to this aspect, in the case where the communication via the first line cannot be established continues over the predetermined period or more, the updated virus definition information is acquired via the second line. Thus, prior to the restart of the communication via the first line, the virus check can be performed by using the latest virus definition information file.

In the above-described embodiment, the third period corresponds to this predetermined period.

(iii) In the case where the computer virus is detected by the virus check, the controller may cut off the communication with the external device via the first line.

According to this aspect, in the case where the computer virus is detected by the virus check, the communication with the external device is cut off without human intervention. Thus, it is possible to promptly suppress the computer virus from infecting the external device.

(iv) In the case where it is determined to be safe as a result of the virus check that is performed by the virus checker using the updated virus definition information, the controller may restart the communication with the external device via the first line that has been cut off. According to this aspect, the virus check is performed by using the updated virus pattern file prior to the restart of the communication with the external device. Thus, it is possible to minimize a risk of spreading the computer virus infection by the restart of the communication.

(v) After the communication with the external device via the first line is restarted, the controller may acquire the virus definition information from the external device that is connected via the first line.

According to this aspect, the updated virus definition information can be acquired from the external device in the similar manner to time before the state where the communication via the first line cannot be established.

(vi) The specific device may be a management device for providing a service remotely. According to this aspect, in the state where the communication via the first line cannot be established, the management device for providing the service remotely can be used as the device that provides the updated virus pattern file. Thus, there is no need to prepare the second line only for redundancy in acquiring the virus pattern file.

(vii) The service may include at least any of collection of data on charging and collection of data on replacement timing of a consumable.

(viii) The second line may provide the communication with the management device by the actual or virtual dedicated line.

According to this aspect, it is possible to ensure data security of the data on charging and the like by the communication via the dedicated line.

(ix) An aspect of the present disclosure includes a virus check method including: communicating with the external device via the first line by the controller of the image processing apparatus; acquiring the virus definition information from the external device; performing the virus check by using the acquired virus definition information; communicating with the specific device via the second line in the state where the communication via the first line can no longer be established; acquiring the updated virus definition information from the specific device; and performing the virus check by using the updated virus definition information.

The aspects of the present disclosure include combinations of any of the above-described plural aspects.

Various modifications can be made to the present disclosure in addition to the above-described embodiments. Those modifications should not be construed as falling outside the scope of the present disclosure. The present disclosure is embodied by the claims and their equivalents, and should embrace all modifications within the scope of the claims.

What is claimed is:

1. An image processing apparatus comprising:
    a first communication circuit for communication with an external device via a first line;
    a second communication circuit for communication with a specific device via a second line;
    a transmission/reception processor that communicates with the external device via the first line or with the specific device via the second line to acquire virus definition information from the external device or the specific device;
    a virus checker that performs a virus check by using the acquired virus definition information; and
    a line selector that selects either one of the communication using the first communication circuit and the communication using the second communication circuit, wherein
    if it is brought into a state where the communication via the first line cannot be established, the line selector selects the second line for acquisition of updated virus definition information from the specific device, and
    in the case where the updated virus definition information is acquired via the second line, the virus checker performs the virus check by using the updated virus definition information;
    wherein in the case where a computer virus is detected by the virus check, the transmission/reception processor cuts off the communication with the external device via the first line, and
    wherein in the case where a virus is not detected as a result of the virus check that is performed by the virus checker using the updated virus definition information, the transmission/reception processor restarts the communication via the first line that has been cut off.

2. The image processing apparatus according to claim 1, wherein
    in the case where the state where the communication via the first line cannot be established continues over a predetermined period or more, the line selector selects the second line.

3. The image processing apparatus according to claim 1, wherein
    after the communication with the external device via the first line is restarted, the line selector acquires the virus definition information from the external device that is connected via the first line.

4. The image processing apparatus according to claim 1, wherein
    the specific device is a management device that provides a service remotely.

5. The image processing apparatus according to claim 4, wherein
    the service includes at least any of collection of data on charging and collection of data on replacement timing of a consumable.

6. The image processing apparatus according to claim 5, wherein
    the second line provides communication with the management device by an actual or virtual dedicated line.

7. A virus check method causing a controller of an image processing apparatus to:
    communicate with an external device via a first line;
    acquire virus definition information from the external device;
    perform a virus check by using the acquired virus definition information;
    communicate with a specific device via a second line if it is brought into a state where the communication via the first line cannot be established;
    acquire updated virus definition information via the second line in the case where the specific device has the updated virus definition information; and
    perform the virus check by using the updated virus definition information;
    wherein in the case where a computer virus is detected by the virus check, the controller cuts off the communication with the external device via the first line, and
    wherein in the case where a virus is not detected as a result of the virus check that is performed by the virus checker using the updated virus definition information, the controller restarts the communication via the first line that has been cut off.

* * * * *